US010095923B2

(12) United States Patent
Parapurath et al.

(10) Patent No.: US 10,095,923 B2
(45) Date of Patent: Oct. 9, 2018

(54) METHOD AND SYSTEM FOR CONFIGURING DEVICES OF A CONTROL SYSTEM BASED ON ENGINEERING GRAPHIC OBJECTS (71) Applicant: ABB Schweiz AG, Baden (CH)

(72) Inventors: Anoop Parapurath, Bangalore (IN); Abhinna Biswal, Bangalore (IN); Abhilash Gopalakrishnan, Bangalore (IN); Lohith HC, Bangalore (IN); Jithin K.P., Kozhikode (IN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/515,168

(22) PCT Filed: Sep. 16, 2015

(86) PCT No.: PCT/IB2015/057116
§ 371 (c)(1),
(2) Date: Mar. 29, 2017

(87) PCT Pub. No.: WO2016/051303
PCT Pub. Date: Apr. 7, 2016

(65) Prior Publication Data
US 2017/0228589 A1 Aug. 10, 2017

(30) Foreign Application Priority Data
Oct. 1, 2014 (IN) .......................... 4954/CHE/2014

(51) Int. Cl.
G06K 9/00 (2006.01)
G05B 19/418 (2006.01)
G06F 17/30 (2006.01)

(52) U.S. Cl.
CPC ... G06K 9/00456 (2013.01); G05B 19/41835 (2013.01); G06F 17/30221 (2013.01);
(Continued)

(58) Field of Classification Search
CPC ...................... G06K 9/00456; G06K 9/00476
(Continued)

(56) References Cited

U.S. PATENT DOCUMENTS 9,094,556 B2 * 7/2015 Ohk .................. H04N 1/00803
2014/0244392 A1 * 8/2014 Chang ................. G06Q 10/087
705/14.58

FOREIGN PATENT DOCUMENTS

CA 2350743 A1 * 1/2002 ......... G06K 9/00476

OTHER PUBLICATIONS

International Search Report, International Application No. PCT/IB2015/057116, dated Dec. 8, 2015, 2 pages.
(Continued)

Primary Examiner — Jacinta M Crawford
(74) Attorney, Agent, or Firm — Barnes & Thornburg LLP (57) ABSTRACT In aspects, the present invention discloses a method of configuring devices of a control system in a plant using a configuration server. The method comprises importing an engineering graphic object, detecting a plurality of textual elements and graphic elements, identifying a set of textual elements and a set of graphic elements as legends, associating the set of graphic elements with corresponding textual elements and the set of textual elements with a corresponding graphic elements, updating a symbol vocabulary and a device label vocabulary using the set of graphic elements and the set of textual elements, associating one or more graphic elements and one or more textual elements from the plurality of graphic elements and the plurality of textual elements with corresponding devices, determining control information of a device based on the associated graphic
(Continued)

elements and associated textual elements, and generating a plurality of engineering artifacts based on the control information.

7 Claims, 8 Drawing Sheets

(52) U.S. Cl.
CPC ..... *G06K 9/00476* (2013.01); *G06K 9/00442* (2013.01); *G06K 2009/00489* (2013.01)

(58) Field of Classification Search
USPC .................................................. 345/419, 619
See application file for complete search history.

(56) References Cited

OTHER PUBLICATIONS

Written Opinion issued in connection with International Application No. PCT/IB2015/057116, dated Dec. 8, 2015, 5 pages.

Tong Lu et al., "Knowledge Extraction from Structured Engineering Drawings", Fuzzy Systems and Knowledge Discovery, Oct. 18, 2008. FSKD '08, Fifth International Conference On, IEEE, Piscataway, NJ, USA.

International Preliminary Report on Patentability, International Application No. PCT/IB2015/057116, dated Apr. 4, 2017, 6 pages.

* cited by examiner

METHOD AND SYSTEM FOR CONFIGURING DEVICES OF A CONTROL SYSTEM BASED ON ENGINEERING GRAPHIC OBJECTS

CROSS-REFERENCE TO RELATED APPLICATIONS

This application is a U.S. national stage of International Application Serial No. PCT/IB2015/057116, filed Sep. 16, 2015, which claims priority to Indian Patent Application No. 4954/CHE/2014, filed Oct. 1, 2014. The entire disclosures of both of the foregoing applications are hereby incorporated by reference.

FIELD OF INVENTION

The current invention relates to a method of configuring of control systems, and more particularly, the current invention relates to automatic generation of various engineering artifacts in relation to control systems, from existing engineering diagrams and process graphics.

BACKGROUND

Design, engineering and commissioning of industrial plants and corresponding control systems is a complex and time consuming process. To simplify the complexities involved, often the engineering is done in phases by various personnel of the automation service provider using various tools. The initial phase involves understanding customer requirements and generating plant specifications by the automation service provider. The automation service provider makes sale proposals by showing prospective engineering diagrams such as process flow diagrams, process and instrumentation (commonly referred to as P&I) diagrams, etc. The prospective engineering diagrams are generally based on the symbol definitions as prescribed by a standard and serve as a major input step towards defining system architectures, network diagrams, logic diagrams, sizing calculations, bill of materials and the like.

In the subsequent phase, on the basis of the prospective engineering diagrams, various engineering artifacts such as I/O lists, conventional plant topology diagrams, etc., are created by adding crucial details and performing necessary operations which are relevant in the context of control engineering and operation. These engineering artifacts are used by control engineers during configuration and commissioning of the devices of the control system.

Conventionally, the generation of engineering artifacts from the prospective engineering diagrams is done manually by automation and control engineers. The task of generation of engineering artifacts requires domain knowledge upon the part of the control engineer and therefore involves high skill related costs. Additionally, this task of conversion and subsequent configuration and commissioning of the devices often includes a lot of basic configurations which are redundant and repeatable which are currently performed manually, thereby leading to an inefficient delivery strategy for large scale engineering projects Therefore, in light of the above discussion, there is a need for a system and method that solves the problems mentioned above.

SUMMARY OF THE INVENTION

The above-mentioned shortcomings, disadvantages and problems are addressed herein which will be understood by reading and understanding the following specification.

In one aspect, the present invention provides a method of configuring one or more devices of a control system in a plant using a configuration server connected to a data repository. The data repository includes one or more engineering graphic objects including one or more engineering diagrams, associated with the plant, in a raster image format and one or more process graphics, associated with the control system, in a raster image format.

The method comprising importing an engineering graphic object from a data repository based on a predetermined criteria, detecting a plurality of textual elements and a plurality of graphic elements within the engineering graphic object by using text detection and symbol detection respectively, identifying a set of textual elements and a set of graphic elements as legends from the plurality of textual elements and plurality of graphic elements respectively, based on predetermined criteria, associating each graphic element from the set of graphic elements with a textual element from the plurality of textual elements based on spatial proximity, associating each textual element from the set of textual elements with a graphic element from the plurality of graphic elements based on spatial proximity, updating a symbol vocabulary and a device label vocabulary using the set of graphic elements and corresponding associated textual elements and the set of textual elements and corresponding associated graphic elements respectively, associating one or more graphic elements and one or more textual elements from the plurality of graphic elements and the plurality of textual elements with corresponding one or more devices of the control system based on the updated symbol vocabulary and the updated device label vocabulary respectively, determining control information of a device from the one or more devices of the control system based on the associated one or more graphic elements and associated textual elements and generating a plurality of engineering artifacts including control logic and at least one of system topology diagram, control logic diagram, face plate of a human machine interface; based on the control information of the device.

Systems and methods of varying scope are described herein. In addition to the aspects and advantages described in this summary, further aspects and advantages will become apparent by reference to the drawings and with reference to the detailed description that follows.

BRIEF DESCRIPTION OF THE DRAWINGS

The subject matter of the invention will be explained in more detail in the following text with reference to preferred exemplary embodiments which are illustrated in the drawings, in which.

DETAILED DESCRIPTION

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 1:
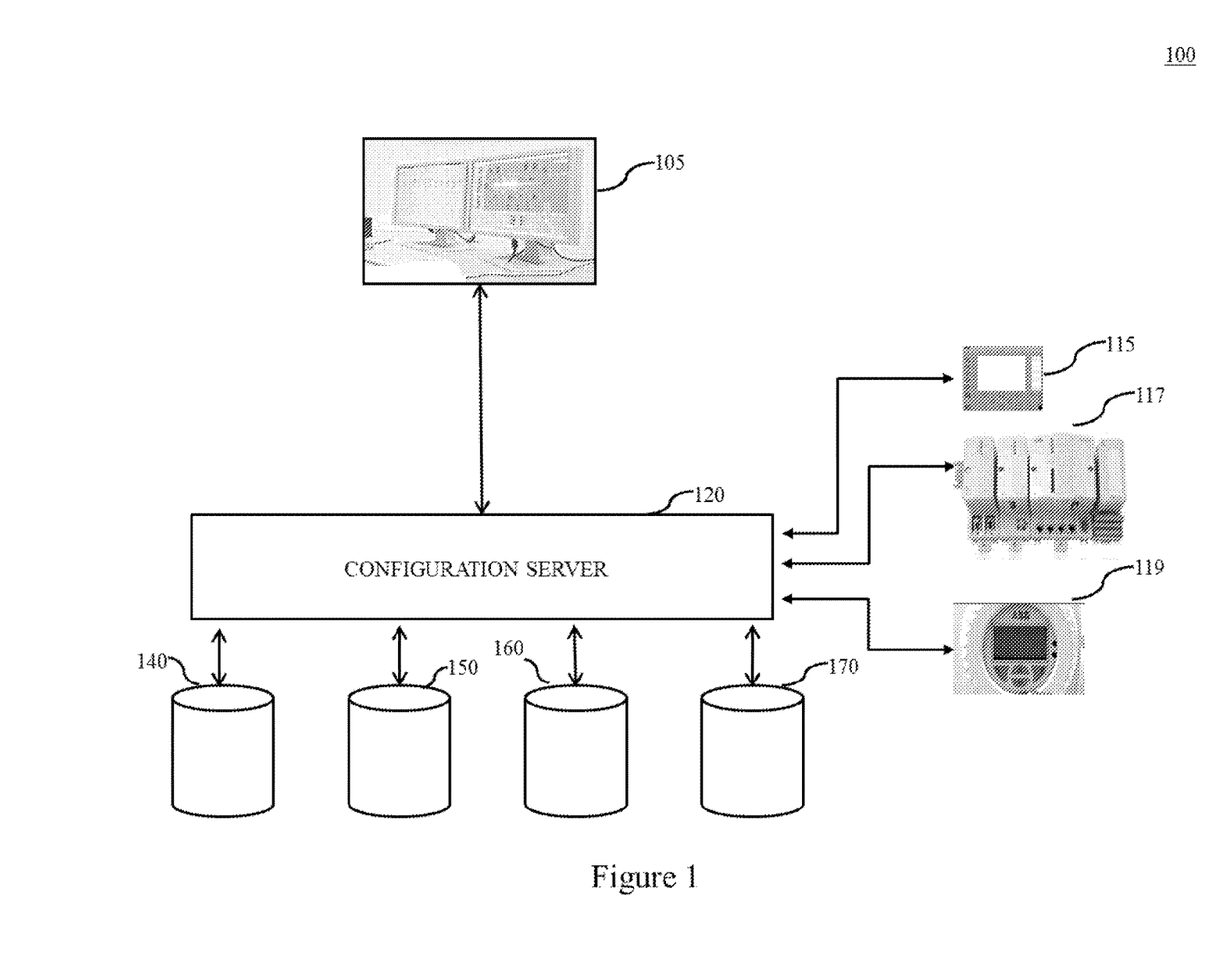
FIG. 1 illustrates a system for configuration of devices of a control system, in accordance with various embodiments of the present invention.

FIG. 1 illustrates a system 100 for configuration of devices of a control system, in accordance with various embodiments of the present invention. The system 100 includes a plurality of data repositories (shown in FIG. 1 as data repository 140, data repository 150, data repository 160, and data repository 170) which are connected to a configuration server 120 for configuration and engineering of the control system 100. The data repositories 140 and 150 include a plurality of engineering graphic objects such as engineering diagrams, process graphics, etc., generated during various phases and stages of engineering by a multiplicity of personnel.

Engineering diagrams includes diagrams such as process flow diagrams, process and instrumentation diagrams etc. These diagrams provide information on the various measurement and process equipment used in the plant along their I/O connections, wiring, location in the plant, etc. Engineering diagrams and process graphics, etc., are stored on the data repositories in raster image format.

The plurality of data repositories are connected over a communication network to a configuration server 120. The configuration server 120 determines control information from the engineering graphic objects and subsequently uses the control information for generating one or more engineering artifacts. The term engineering artifacts includes system topology diagrams for the plant or facility, control logic diagrams, configuration files for controllers, Intelligent Electronic Devices, human machine interfaces and the like.

After generating the engineering artifacts, the configuration server 120 deploys the configuration files on the corresponding devices (shown in FIG. 1 as intelligent electronic device 115, controller 117 and human machine interface 119 of a flowmeter). The remaining engineering artifacts such as system topology diagrams, control logic diagrams, etc., are stored in the data repositories 160 and 170. If similar engineering graphic objects are found in the data repository 160 or the data repository 170, the configuration server 120 updates the engineering graphic objects in the data repository (160 or 170) according to the engineering artifacts generated.

In an embodiment, a data centric approach is used to store the remaining engineering artifacts or update engineering data in the data repositories by the configuration server 120.

The plurality of data repositories register with the configuration server 120 by sending one or more subscription requests. Accordingly, the configuration server 120 publishes the one or more engineering artifacts to the one or more data repositories.

In an embodiment, when a change is made to the persisted engineering artifact, the configuration server 120 is configured to receive notification regarding the change and is able to validate the change by checking whether the change is conflicting or in compliance with the other engineering artifacts. By doing so, the configuration server 120 is able to remove anomalies and conflicts among engineering graphic objects and the engineering artifacts stored on the plurality of data repositories.

The configuration server 120 is connected to an engineering workstation 105. An engineer can interact and configure the configuration sever 120 using the engineering workstation 105. The aspects in relation to the configuration server 120 are explained further in the description of FIG. 2 using examples.

Figure 2:
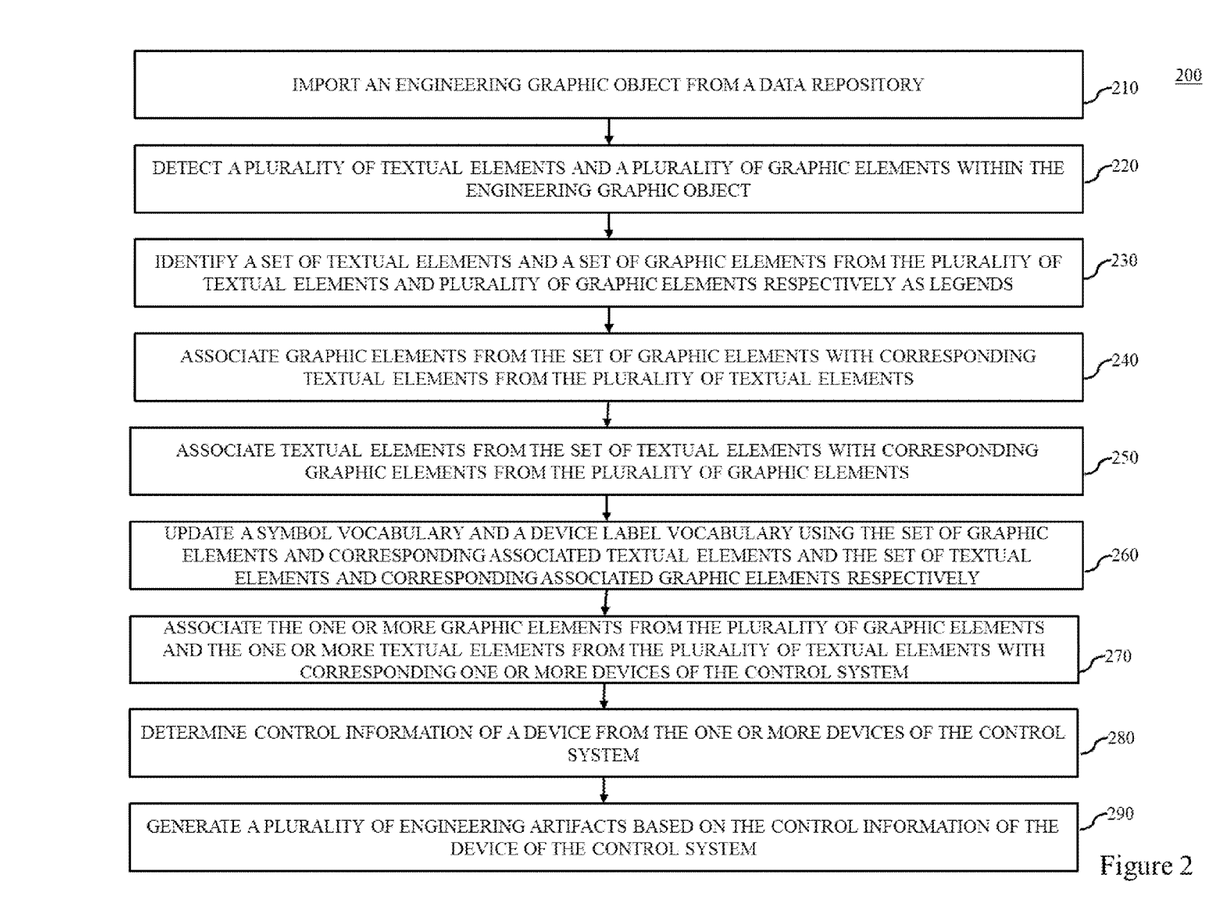
FIG. 2 illustrates a method for configuration of devices of a control system, in accordance with various embodiments of the present invention.

FIG. 2 illustrates a method 200 of configuring one or more devices of a control system 100 in a plant, in accordance with various embodiments of the present invention. At step 210, the configuration server 120 imports an engineering graphic object from the data repository 140.

At step 220, the configuration server 120 detects a plurality of textual elements and graphic elements within the engineering graphic object using a plurality of text detection and symbol detection techniques.

In an embodiment, the engineering graphic object is reconstructed using a plurality of image reconstruction techniques known to a person skilled in the art. The plurality of image reconstruction techniques include but are not limited to filtered back projection, mix of textual detection, symbol detection, image filters like inverse, and contours, such as objects which are included by the area selected form a sound baseline for detection. Once a certain quality of the diagram is identified, an appropriate reconstruction procedure is applied for all diagrams from same plant or customer.

Figure 4:
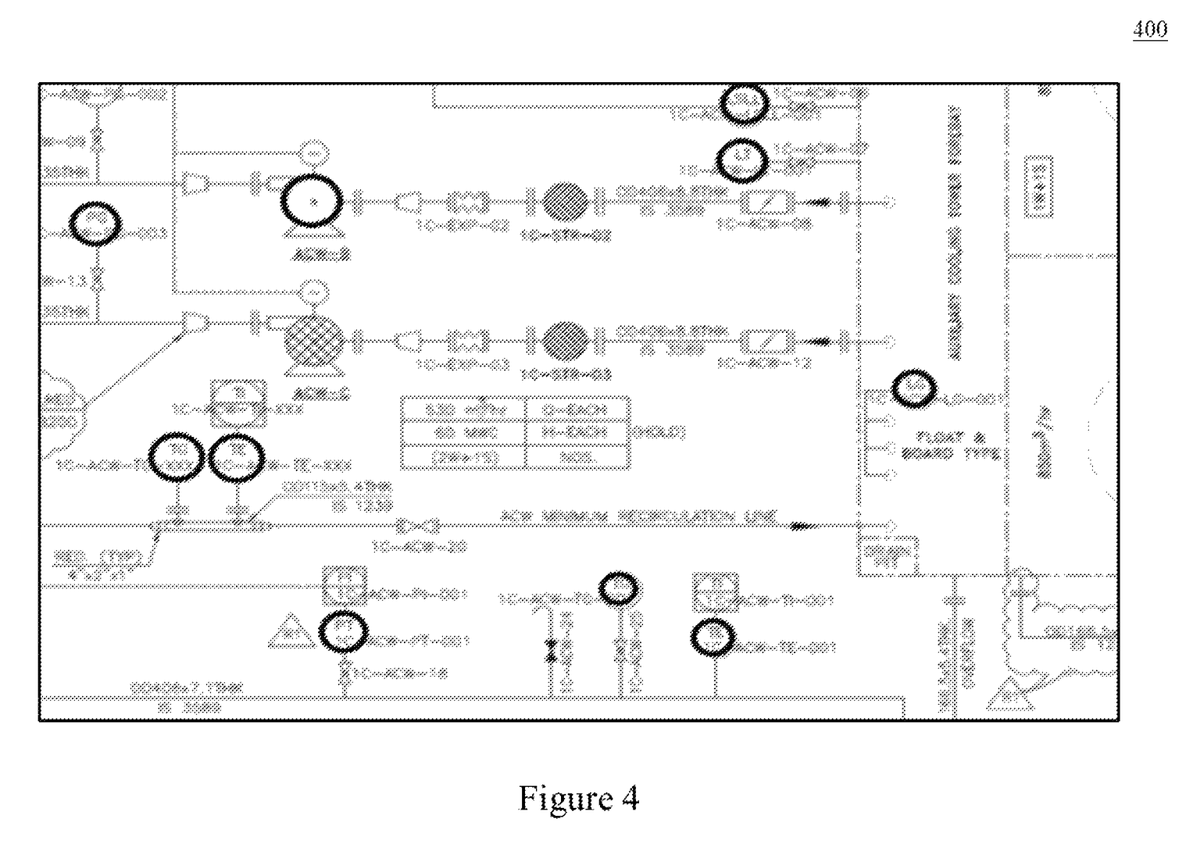
FIGS. 4 illustrates one or more detected graphical elements of a piping and instrumentation diagram, in accordance with various embodiments of the present invention.

In an embodiment, the symbols are detected using Hough Circles and edge detection techniques. Based on the aspect ratios and size verifications, irrelevant symbols are filtered out. For example, as illustrated in FIG. 4, the configuration server 120 determines relevant symbols (indicated with dark circles). In an embodiment, when a graphic element is detected, then the graphic element is cropped to the segments of text present in the circle or the contour detected. The image from inside the circle is now used to extract the segments from symbol image which are prospective text areas. Now these text segments are passed on to a process symbol-based Optical Character Recognition prediction scheme which returns the text embedded in the segment as textual elements.

At step 230, the configuration server 120 identifies a set of textual elements and a set of graphic elements from the plurality of textual elements and plurality of graphic elements respectively as legends based on predetermined criteria. This is further explained using an engineering diagram 305 shown in FIG. 3.

Figure 3:
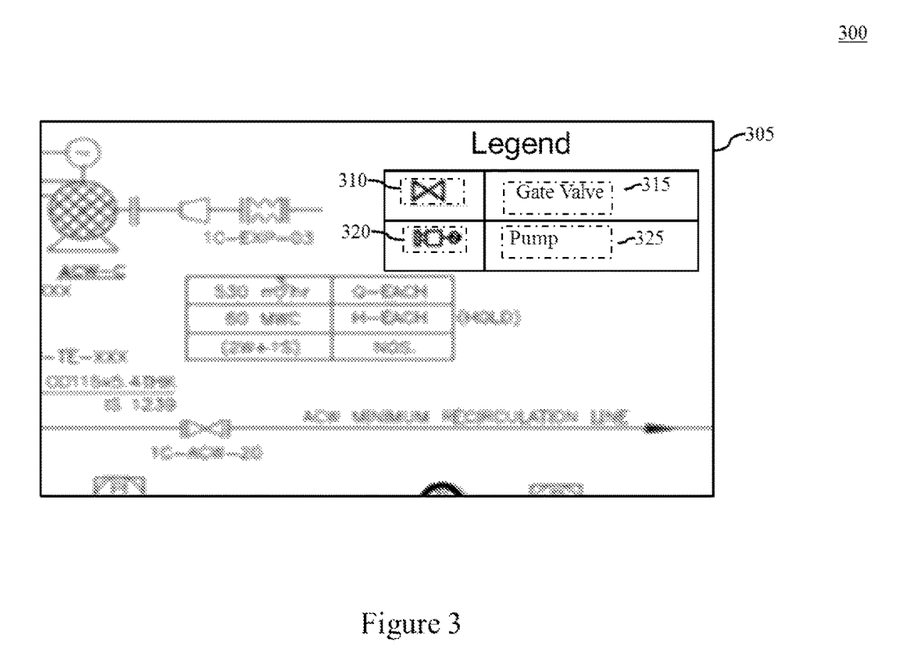
FIG. 3 illustrates a symbol legend and a symbol format as used in an exemplary engineering diagram.

In an embodiment, each graphic element from the plurality of graphic elements is compared with symbols defined in a symbol vocabulary file. In an embodiment, the contours of the graphic element are compared and checked with a symbol vocabulary. The symbol vocabulary includes a plurality of symbols along with the corresponding description. In an embodiment, the symbol vocabulary includes Support Vector Machine trained data. If the compared graphic element is identical in shape and aspect to a symbol from the symbol vocabulary, then the compared graphic element is not identified as a legend. If the compared graphic element is not identical in shape and aspect to any of the symbols of the symbol vocabulary, then the compared graphic element is identified as a legend and is included in the set of graphic elements. For example, graphic element 310 (indicating a gate valve) is identified as a legend when the symbol vocabulary does not include a symbol for a gate valve or has a different symbol for a gate valve.

In another embodiment, a graphic element from the plurality of graphic elements identified as a legend based on the position of the graphic element and bounding. If the graphic element is bounded in a box or a table shaped area by continuous lines, the graphic element is identified as a legend and is included in the set of graphic elements. For example, graphic element 310 is located in proximity of the top-left corner of engineering diagram 305 and is within a bounded legend table and therefore is identified as a legend.

In yet another embodiment, a graphic element from the plurality of graphic elements is identified as a legend based on the number of lines connecting the graphic element with another connected graphic element. When a graphic element is disconnected i.e. does not have any lines connecting to the graphic element, the graphic element is identified as a legend and is included in the set of graphic elements. For example, graphic element 310 does not have any lines connecting the graphic element 310 to any other connected graphic element and is therefore classified as a legend element.

In an embodiment, all the criteria mentioned above are utilized for deciding is a particular graphic element qualifies as a legend. Weights can be assigned to each criteria to prioritize the criteria.

Similarly, in an embodiment, each textual element from the plurality of textual elements is compared with device labels defined in a label vocabulary. If the compared textual element is identical to a device label from the label vocabulary, then the compared textual element is not identified as a legend. Else, the compared textual element is identified as a legend and is included in the set of textual elements. For example, textual element 315 "Gate valve" is identified as a legend when the vocabulary does not include device label "Gate valve" or has a different notation for a gate valve or includes a "Gate valve" in a different language.

In another embodiment, a textual element from the plurality of textual elements identified as a legend based on the position of the textual element and bounding. If the textual element is bounded in a box or a table shaped area by continuous lines, the textual element is identified as a legend and is included in the set of graphic elements. For example, textual element 315 is located in proximity of the top-left corner of engineering diagram 305 and is within a bounded legend table and therefore is identified as a legend.

In an embodiment, all the criteria mentioned above are utilized for deciding is a particular textual element qualifies as a legend. Weights can be assigned to each criteria to prioritize the criteria.

At step 240, after identifying a graphic element as a legend, the configuration server 120 determines a corresponding textual element within a proximity of the graphic element identified as legend. The configuration server 120 creates an association between the graphic element and the textual element. For example, the configuration server 120 determines textual element 315 as within proximity of the graphic element 310 and associates the textual element 315 with the graphic element 310. If there are more than one textual elements within proximity of the graphic element, the textual element which has the least distance from the graphic element 310 is determined as the corresponding textual element. In an embodiment, the association between the determined textual element and the graphic element will be flagged, wherever the determination is based on proximity, to resolve conflicts.

Similarly, at step 250, after identifying a textual element as a legend, the configuration server 120 determines a corresponding graphic element within a proximity of the textual element identified as legend. The configuration server 120 creates an association between the graphic element and the textual element. For example, the configuration server 120 determines textual element 325 as within proximity of the graphic element 320 and associates the textual element 325 with the graphic element 320. If there are more than one graphic elements within proximity of the textual element, the graphic element which has the least distance from the textual element 320 is determined as the corresponding graphic element.

At step 260, the configuration server 120 updates the symbol vocabulary and the label vocabulary based on the set of textual elements and set of graphic elements identified as legends. In an embodiment, the configuration server 120 updates the symbol vocabulary by including the set of graphic elements as new symbols. The textual element associated with graphic element is stored in the symbol vocabulary as the symbol definition for the graphic element. Similarly, in an embodiment, the configuration server 120 updates the label vocabulary by including the set of textual elements as new device labels. The symbol definition of graphic element associated with the textual element identified as legend, is stored in the device label as the definition for the textual element. Additionally, in the symbol vocabulary, the symbol definition of the associated graphic element is appended to include the textual element which was identified as the legend.

In an embodiment, prior to updating the symbol vocabulary and the label definition vocabulary, the configuration server 120 verifies the association between the set of textual elements identified as legends and the corresponding graphic elements based on user input from an automation engineer at the operation station 105. Similarly, in an embodiment, prior to updating the symbol vocabulary and the label definition vocabulary, the configuration server 120 verifies the association between the set of graphic elements identified as legends and the corresponding textual elements based on user input from an automation engineer.

At step 270, the configuration server 120 associates the one or more graphic elements from the plurality of graphic elements and the one or more textual elements from the plurality of textual elements with corresponding one or more devices of the control system based on the updated symbol vocabulary and the updated device label vocabulary. The configuration server 120 utilizes the symbol definition and the device label definition to determine if the graphic element or textual element is associated with a device of the control system.

In an embodiment, the configuration server 120 performs a semantic and phonetic look up of the name and type of the device in the symbol definition or device label definition and if the name or the type of the device is mentioned in the definition, the configuration associates the graphic or textual element with the device. For example, the symbol 320 would include the word "pump" in its symbol definition and therefore associated with a pump device.

At step 280, the configuration server 120 determines control information of a device from the one or more devices of the control system based on the associated one or more graphic elements and textual elements associated with the associated one or more graphic elements. Control information includes the functional area of the device, process inputs and outputs to and from the device, etc.

Figure 5:
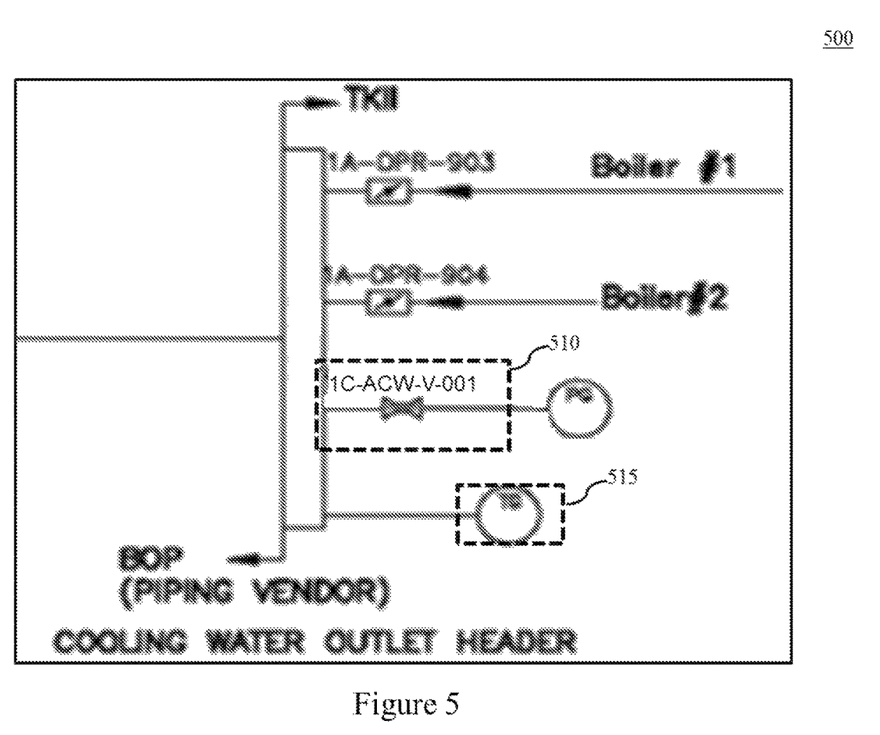
FIG. 5 illustrates two graphical elements along with the associated textual elements in an engineering diagram, in accordance with various embodiments of the present invention.
Figure 6:
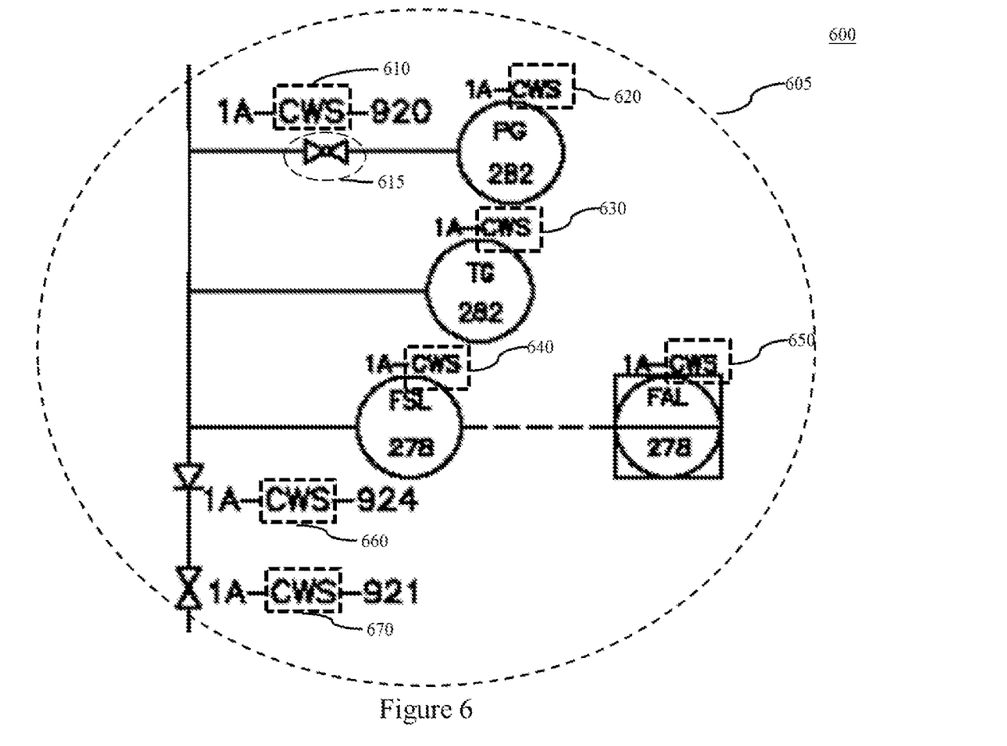
FIG. 6 illustrates a cluster of textual elements in proximity of each other belonging to a functional area CWS, in accordance with various embodiments of the present invention.

The functional area of the device is determined based on the textual element (i.e. the device label) associated with the corresponding graphical element. For example, as indicated in FIG. 5, the valve in area marked 510 includes an associated textual element 1C-ACW-V-001 indicates the functional area Auxiliary Cooling Water (ACW). In an embodiment, the configuration server 120 identifies one or more functional areas from one or more clusters of textual elements. For example, as illustrated in FIG. 6, the configuration server 120 identifies a cluster of textual elements 605 based on the presence of a common phrase (CWS; which stands for functional area cooling water station) in the textual elements 610, 620, 630, 640, 650, 660 and 670 which are in close proximity to each other. On the basis of the cluster 605, the configuration server 120 identifies CWS as a functional area. Accordingly, for the valve 615, the configuration server 120 determines that the valve 615 belongs to the functional area CWS based on the cluster 605.

Figure 7:
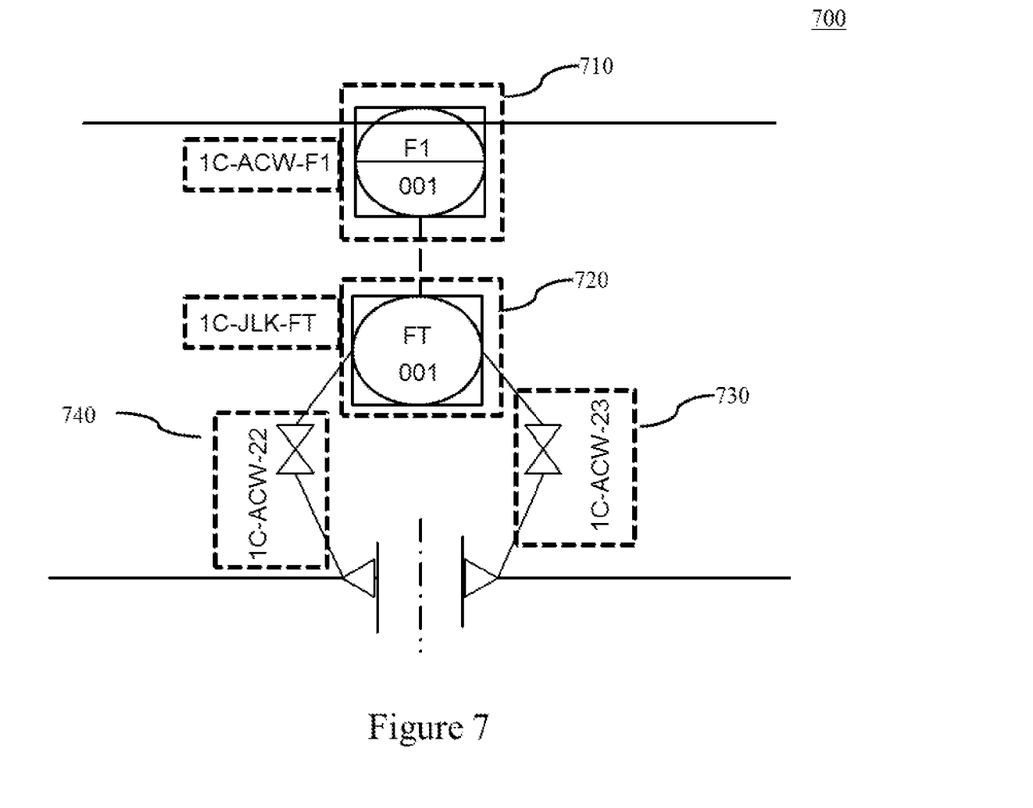
FIG. 7 illustrates a section of an engineering diagram indicating connections of a flow transmitter, in accordance with various embodiments of the present invention.

The inputs and outputs of the device can be determined based on incoming and outgoing connections (indicated by lines in the engineering diagram) to the corresponding graphic element from other connected graphic elements. For example, as illustrated in FIG. 7, the flow transmitter 720 is connected to a control element 710 (which is a control value actuator) and to valves 740 and 730. On the basis of the connections, the configuration server 120 can determine that the flow transmitter has I/Os linking to the control element 710 and to the valves 740 and 730. In an embodiment, the configuration server 120 can determine the type of I/O connected to a device based on the device label definitions and the symbol definitions of the corresponding graphic elements connected to the graphic element associated with the device. For example, the device label definition for the flow transmitter 720 indicate that the flow transmitter is of analog input type. Accordingly, since the flow transmitter 720 is connected to the control element 710, the configuration server 120 determines the control element (which is the control valve actuator) 710 includes an analog output.

At step 290, the configuration server 120 generates a plurality of engineering artifacts including control logic and at least one of system topology diagram, control logic diagram, face plate of a human machine interface; based on the control information of the one or more devices of the control system. The control information is used, by the configuration server 120, to create an instrument list, a signals list, and I/O List, which is the key input to engineering and provided in spreadsheet or Comma Separated Value or similar formats. Together with I/O list, the HMI Elements or Equipment List is also created with the graphical (X, Y) positions of the graphic elements associated with the devices. The configuration server 120 instantiates a number of control devices from controllers, operator stations and servers based on the I/O list. This involves the number of analog I/Os, Digital I/Os capability of the controllers, their communication capabilities and their interfaces and the operator stations and their interfaces and functional area based organization of network topologies and information and communication.

Based on equipment list and the mapping to the new HMI elements, the new HMI elements are instantiated. The control logic is prepared by preparing the control function blocks and creating a network of function blocks based on the control libraries and scheduling these function blocks to respond as per the timing requirements described in control information. The HMI elements created are fixed on the relevant pages or reorganized for visual improvements. The control logic prepared is now connected to I/Os so that the control logic can take inputs from field and respond over the outputs/actuators.

In an embodiment, the configuration server 120 can perform verification of the association of a textual element identified as legend, with corresponding graphic element on the basis of the connections of the corresponding graphic element.

For example, as illustrated in FIG. 7, flow transmitter symbol 720 is connected to a control element 710 and valves 740 and 730. The textual element 1C-JLK-FT is within close proximity of the flow transmitter symbol 720 and therefore is associated with the flow transmitter symbol 720. Based on cluster of textual elements the configuration server 120 determines that the functional area is ACW. However, the textual element 1C-JLK-FT associated with flow transmitter symbol 720 does not include the identified functional area "ACW". On this basis the configuration server 120 determines that the textual element 1C-JLK-FT is incorrectly associated with the flow transmitter symbol 720.

Figure 8:
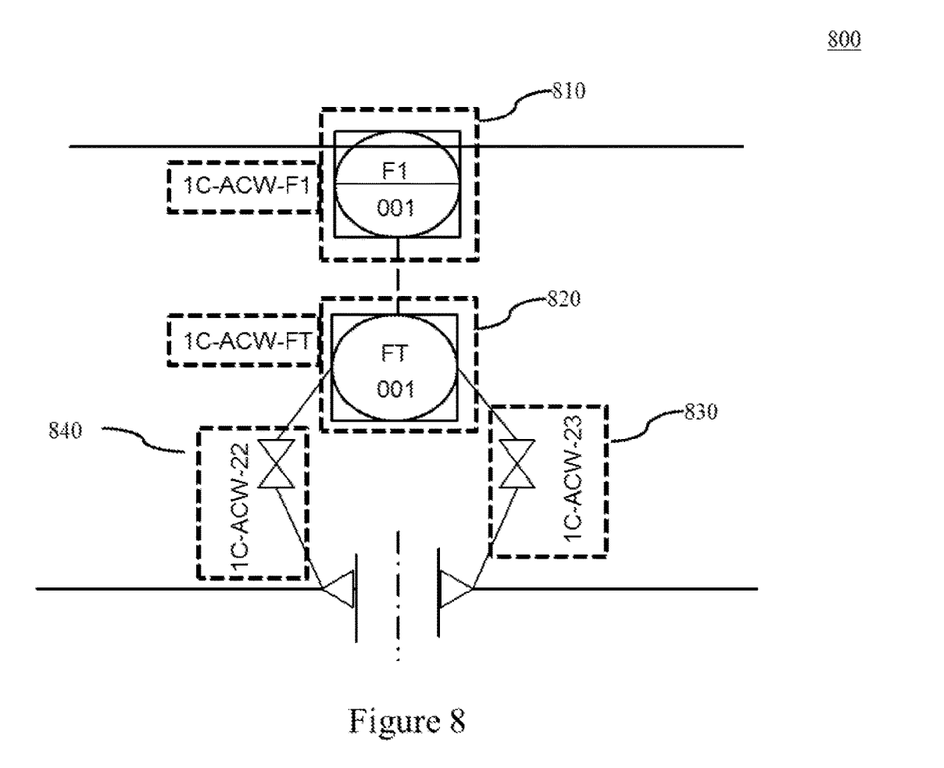
FIG. 8 illustrates a section of an engineering diagram indicating connections of a flow transmitter, in accordance with various embodiments of the present invention.

In an embodiment, the configuration server 120 can verify control philosophy associated with a device based on the corresponding graphic element and the connections to the graphic element. For example, as illustrated in FIG. 8 flow transmitter symbol 820 is connected to a control element 810 and valves 840 and 830. Based on the connection between the flow transmitter 820 and the control element 810, the configuration can determine that control philosophy associated with the flow transmitter is a closed loop control.

In an embodiment, the configuration server 120 can migrate diagrams to a new standard. For example, an engineering diagram could have one or more graphic elements which are no longer in practice and have been replaced with symbols in accordance with a new standard. The configuration server replace the graphic element with the new symbol as defined in the standard based on the textual element associated with graphic element to be replaced.

In an embodiment, the configuration server 120 can translate diagrams to a different language. For example, an engineering diagram could have one or more textual elements which are in a first language. The configuration server replace the textual elements with the textual elements in a second language based on the graphic element associated with textual element to be replaced.

The current invention strengthens the detection process of the plant for retrofitting, for maintenance, for compliance and regulation. Equipment detection is achieved from defined graphics or HMI pages to create the graphic elements/symbols for operator experience. Equipment detection is integrated together with process detection and could be run simultaneously as well.

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of configuring one or more devices of a control system in a plant using a configuration server connected to a data repository, wherein the data repository stores one or more engineering graphic objects, wherein the one or more engineering graphic objects includes (i) one or more engineering diagrams, associated with the plant, and (ii) one or more process graphics, associated with the control system, the method comprising:

importing, with the configuration server, an engineering graphic object of the one or more engineering graphic object stored in the data repository based on a predetermined criteria;

detecting, with the configuration server, a plurality of textual elements and a plurality of graphic elements within the engineering graphic object by using text detection and symbol detection respectively;

identifying, with the configuration server, a set of textual elements and a set of graphic elements as legends from the plurality of textual elements and plurality of graphic elements respectively, based on predetermined criteria;

associating, with the configuration server, each graphic element from the set of graphic elements with a textual element from the plurality of textual elements based on spatial proximity;

associating, with the configuration server, each textual element from the set of textual elements with a graphic element from the plurality of graphic elements based on spatial proximity;

updating, with the configuration server, a symbol vocabulary and a device label vocabulary using the set of graphic elements and corresponding associated textual elements and the set of textual elements and corresponding associated graphic elements respectively;

associating, with the configuration server, one or more graphic elements and one or more textual elements from the plurality of graphic elements and the plurality of textual elements with corresponding one or more devices of the control system based on the updated symbol vocabulary and the updated device label vocabulary respectively;

determining, with the configuration server, control information of a device from the one or more devices of the control system based on the associated one or more graphic elements and associated textual elements; and generating, with the configuration server, a plurality of engineering artifacts including control logic and at least one of an input/output (I/O) list, system topology diagram, control logic diagram, and face plate of a human machine interface based on the control information of the device.

2. The method as claimed in claim 1, wherein the symbol vocabulary includes a plurality of symbols along with the corresponding description for the plurality of symbols.

3. The method as claimed in claim 1, wherein control information of the device includes a functional area associated with the device, inputs and outputs of the device.

4. The method as claimed in claim 3, wherein determining control information of the device from the one or more devices of the control system based on the associated one or more graphic elements and associated textual elements includes:

determining, with the configuration server, the inputs and outputs of the device based on incoming and outgoing connections to the corresponding graphic element associated with the device from one or more connected graphic elements; and determining, with the configuration server, the functional area associated with the device based on a cluster of textual elements within proximity of the corresponding textual element associated with the device.

5. The method as claimed in claim 1, wherein the method further includes verifying, with the configuration server, an association between a graphic element identified as a legend and an associated textual element on the basis of the connections between the graphic element and one or more connected graphic elements.

6. The method of claim 1, wherein the control information of the device includes process input signals and process output signals associated with the device.

7. The method of claim 6, wherein the I/O list is generated based on the process input signals and process output signals associated with the device.

\* \* \* \* \*